US012691530B2

(12) United States Patent
Ly et al.

(10) Patent No.: US 12,691,530 B2
(45) Date of Patent: Jul. 28, 2026

(54) METHOD FOR ENHANCEMENT OF LASER MATERIAL PROCESSING VIA MODULATION OF LASER LIGHT INTENSITY

(71) Applicant: LAWRENCE LIVERMORE NATIONAL SECURITY, LLC, Livermore, CA (US)

(72) Inventors: Sonny S. Ly, Mountain House, CA (US); Jeffrey D. Bude, Livermore, CA (US); Gabriel Mark Guss, Manteca, CA (US); Wesley John Keller, Orinda, CA (US); Raluca A. Negres, Pleasanton, CA (US); Alexander M. Rubenchik, Livermore, CA (US); Nan Shen, Milpitas, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 993 days.

(21) Appl. No.: 17/040,098

(22) PCT Filed: Mar. 22, 2019

(86) PCT No.: PCT/US2019/023558
§ 371 (c)(1),
(2) Date: Sep. 22, 2020

(87) PCT Pub. No.: WO2019/183465
PCT Pub. Date: Sep. 26, 2019

(65) Prior Publication Data
US 2021/0023658 A1    Jan. 28, 2021

Related U.S. Application Data

(60) Provisional application No. 62/647,521, filed on Mar. 23, 2018.

(51) Int. Cl.
B23K 26/382     (2014.01)
B23K 26/06     (2014.01)
(Continued)

(52) U.S. Cl.
CPC ........ B23K 26/382 (2015.10); B23K 26/0622 (2015.10); B23K 26/0626 (2013.01); B23K 26/0648 (2013.01); B23K 26/0665 (2013.01)

(58) Field of Classification Search
None
See application file for complete search history.

(56) References Cited

U.S. PATENT DOCUMENTS

| 4,752,669 A | 6/1988 | Sharp et al. |
| 6,809,291 B1 | 10/2004 | Neil et al. |

(Continued)

FOREIGN PATENT DOCUMENTS

| DE | 102004041502 A1 * | 3/2006 | ............. B23K 26/06 |
| DE | 102009056592 A1 * | 6/2011 | ......... B23K 26/0622 |

(Continued)

OTHER PUBLICATIONS

International Search Report and Written Opinion of the ISA issued in PCT/US2019/023558, mailed Jul. 4, 2019; ISA/KR.
(Continued)

*Primary Examiner* — John J Norton
(74) *Attorney, Agent, or Firm* — HARNESS, DICKEY & PIERCE P.L.C.

(57) ABSTRACT

The present disclosure relates to a laser-based system and method for providing efficient melt removal of material from a surface of a material sample being acted on in a laser machining operation. In one implementation the system may make use of a continuous wave (CW) laser for generating a laser beam directed at a spot on the surface of the material sample. The CW laser may be configured to be modulated at
(Continued)

a predetermined frequency such that the laser beam excites and amplifies surface capillary waves on the surface of the sample up to a melt ejection point, which ejects molten material from the spot being acted on by the laser beam, to more rapidly facilitate material removal from the spot.

5 Claims, 7 Drawing Sheets

(51) Int. Cl.
    *B23K 26/062*       (2014.01)
    *B23K 26/0622*    (2014.01)
    *B23K 26/064*     (2014.01)

(56)              References Cited

U.S. PATENT DOCUMENTS

| | | | | |
|---|---|---|---|---|
| 2004/0026381 A1* | 2/2004 | Tsukamoto | ............ | B23K 26/24 |
| | | | | 219/121.6 |
| 2005/0006359 A1* | 1/2005 | Blakey | .................... | B05B 1/185 |
| | | | | 219/121.71 |

| | | | | |
|---|---|---|---|---|
| 2006/0207977 A1 | 9/2006 | Hermann et al. | | |
| 2008/0000888 A1 | 1/2008 | Schulz et al. | | |
| 2015/0224597 A1 | 8/2015 | Olsen | | |
| 2016/0207977 A1 | 7/2016 | Olsen et al. | | |
| 2017/0314109 A1* | 11/2017 | McCloskey | ............. | B22F 10/64 |
| 2017/0320164 A1* | 11/2017 | Shin | ................... | B23K 26/0093 |
| 2017/0320168 A1 | 11/2017 | Martinsen | | |
| 2018/0236605 A1* | 8/2018 | Finuf | ................... | B23K 26/032 |

FOREIGN PATENT DOCUMENTS

| | | | | |
|---|---|---|---|---|
| DE | 102012008940 A1 * | 11/2013 | ............ | B23K 26/03 |
| DE | 102016204578 B3 | 8/2017 | | |
| EP | 1429888 B1 | 4/2009 | | |
| JP | 2010508149 A | 3/2010 | | |
| WO | 2008052547 A1 | 5/2008 | | |

OTHER PUBLICATIONS

Extended European Search Report regarding International Application No. 19771186.4, mailed Jul. 28, 2021.

\* cited by examiner

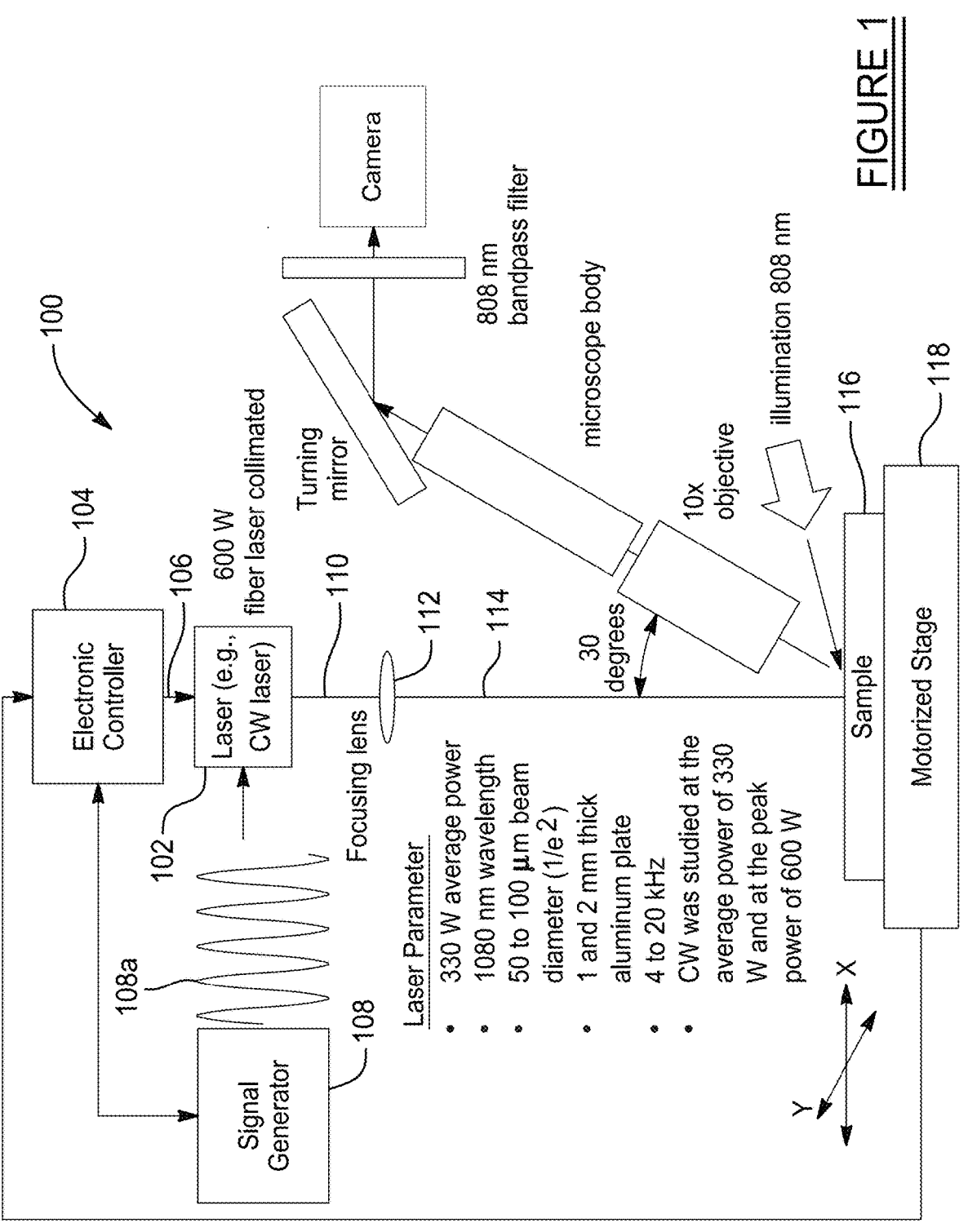

100

Electronic Controller — 104

Laser (e.g., CW laser) — 102

106

Signal Generator — 108

108a

600 W fiber laser collimated

Turning mirror

Focusing lens

110

112

114

808 nm bandpass filter

Camera microscope body 10x objective 30 degrees illumination 808 nm

116

Sample

Motorized Stage

118

Laser Parameter
- 330 W average power
- 1080 nm wavelength
- 50 to 100 μm beam diameter (1/e 2)
- 1 and 2 mm thick aluminum plate
- 4 to 20 kHz
- CW was studied at the average power of 330 W and at the peak power of 600 W

Volume Render

METHOD FOR ENHANCEMENT OF LASER MATERIAL PROCESSING VIA MODULATION OF LASER LIGHT INTENSITY

CROSS-REFERENCE TO RELATED APPLICATIONS

This application is a U.S. National Phase Application under 35 U.S.C. 371 of International Application No. PCT/US2019/023558, filed on Mar. 22, 2019, which claims the benefit of U.S. Provisional Application No. 62/647,521, filed on Mar. 23, 2018. The entire disclosures of the above applications are incorporated herein by reference.

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to laser systems and methods used for various processing operations, and more particularly to laser systems and methods in which resonance excitation of surface waves results in effective melt ejection from a material being acted on, at lower intensities without light absorption in the vapor plume.

BACKGROUND

This section provides background information related to the present disclosure which is not necessarily prior art.

Laser metal drilling and cutting involves melting the metal and removing the molten liquid from the hole. Typically the removal is performed by a pressurized gas stream but this removal mechanism is difficult to use when the drill hole is small (~mm). In this case, the melt is removed by the recoil pressure produced by the metal vapors ejected from the heated surface. During melting, the temperature of the metal surface approaches and exceeds the boiling temperature $T_b$, and a metallic vapor jet is formed. Recoil pressure generated by the vapor expansion produces a downward force on the melt pool causing rapid melt pool motion leading to liquid melt being ejected away. For effective material removal, a large area of the metal surface must be heated to above $T_b$, requiring significantly more energy than required to melt the surface. For example, aluminum has a $T_b$~2,730K nearly three times higher than the melting point $T_m$~933K which requires raising the laser power by the same factor (varies linearly with $T_b/T_m$). At high laser power, other highly undesirable effects occur. The intense vapor flux absorbs the laser beam and shields the surface, further reducing the efficiency. In addition, the undesirable overheating affects the cooling process and can lead to cracking on the metal surface and inside the hole walls, degrading the process quality

SUMMARY

This section provides a general summary of the disclosure, and is not a comprehensive disclosure of its full scope or all of its features.

In one aspect the present disclosure relates to a laser system for providing efficient melt removal of material from a surface of a material sample being acted on in a laser machining operation. The system may make use of a continuous wave (CW) laser for generating a laser beam directed at a spot on the surface of the material sample. The CW laser may be configured to be modulated at a predetermined frequency such that the laser beam excites and amplifies surface capillary waves on the surface of the sample up to a melt ejection point, which ejects molten material from the spot being acted on by the laser beam, to more rapidly facilitate material removal from the spot.

In another aspect the present disclosure relates to a laser system for providing efficient melt removal of material from a surface of a metal material sample being acted on in a laser machining operation. The system may comprise a continuous wave (CW) laser for generating a laser beam directed at a spot on the surface of the material sample. The laser may be modulated at a predetermined frequency which is sufficient to excite and amplify surface capillary waves on the surface of the sample up to a melt ejection point, to eject molten material from the spot and to facilitate more rapidly forming a hole at the spot. The predetermined frequency of the capillary waves is given by the expression: $\omega=(\sigma^3/\rho)^{1/2}$, where "$\sigma$" is surface tension, "k" is a wave number, and "$\rho$" is a metal density of the sample.

In still another aspect the present disclosure relates to a method for providing efficient melt removal of material from a spot on a surface of a material sample. The method may comprise using a continuous wave (CW) laser to generate a collimated laser beam, and focusing the collimated laser beam to a desired spot size on the surface of the material sample. The method may further comprise modulating the collimated laser beam from the CW laser at a predetermined frequency which is sufficient to excite and amplify surface capillary waves on the surface of the sample up to a melt ejection point, to eject material from the spot on the surface of the sample.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a high level drawing of one embodiment of the present disclosure using a high speed imaging setup off axis (30 degrees off axis in this example) from an ablation laser beam path, which captured images showing the effects of exposing aluminum plates to a beam of periodically modulated intensity;

Figures 3A, 3B, 3C:
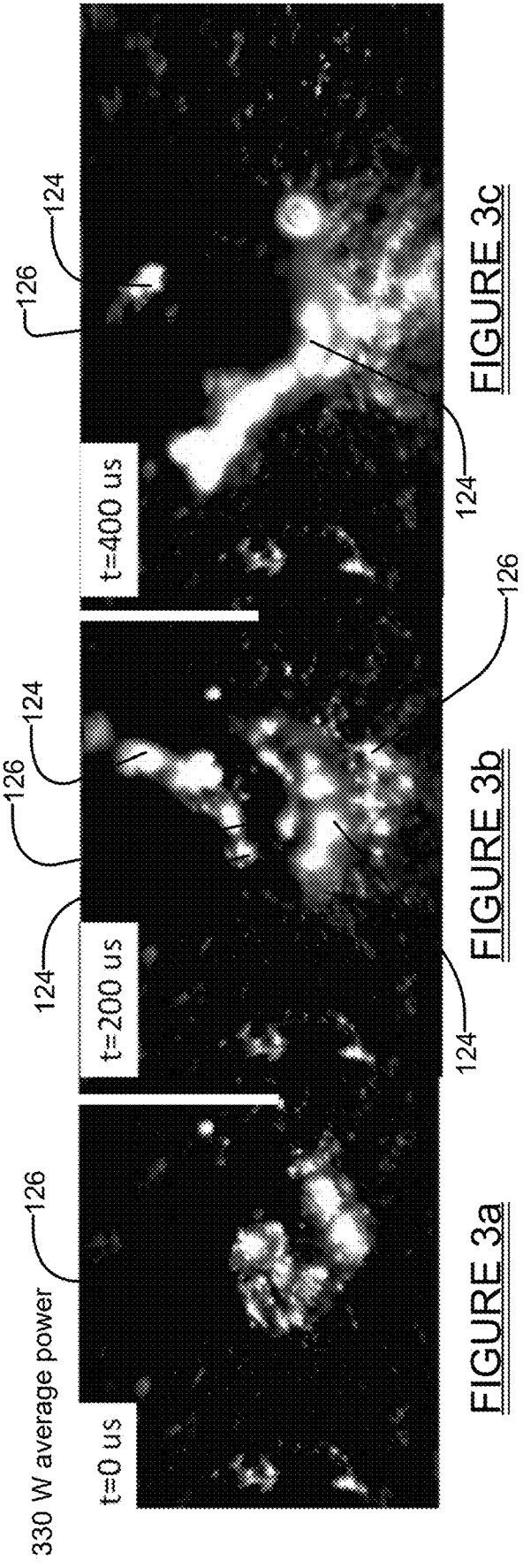
Figure 4A:
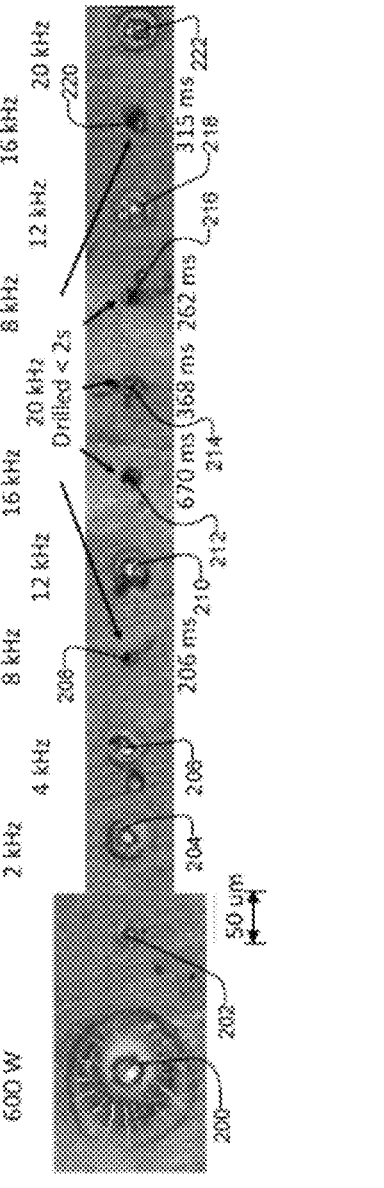
Figure 4B:
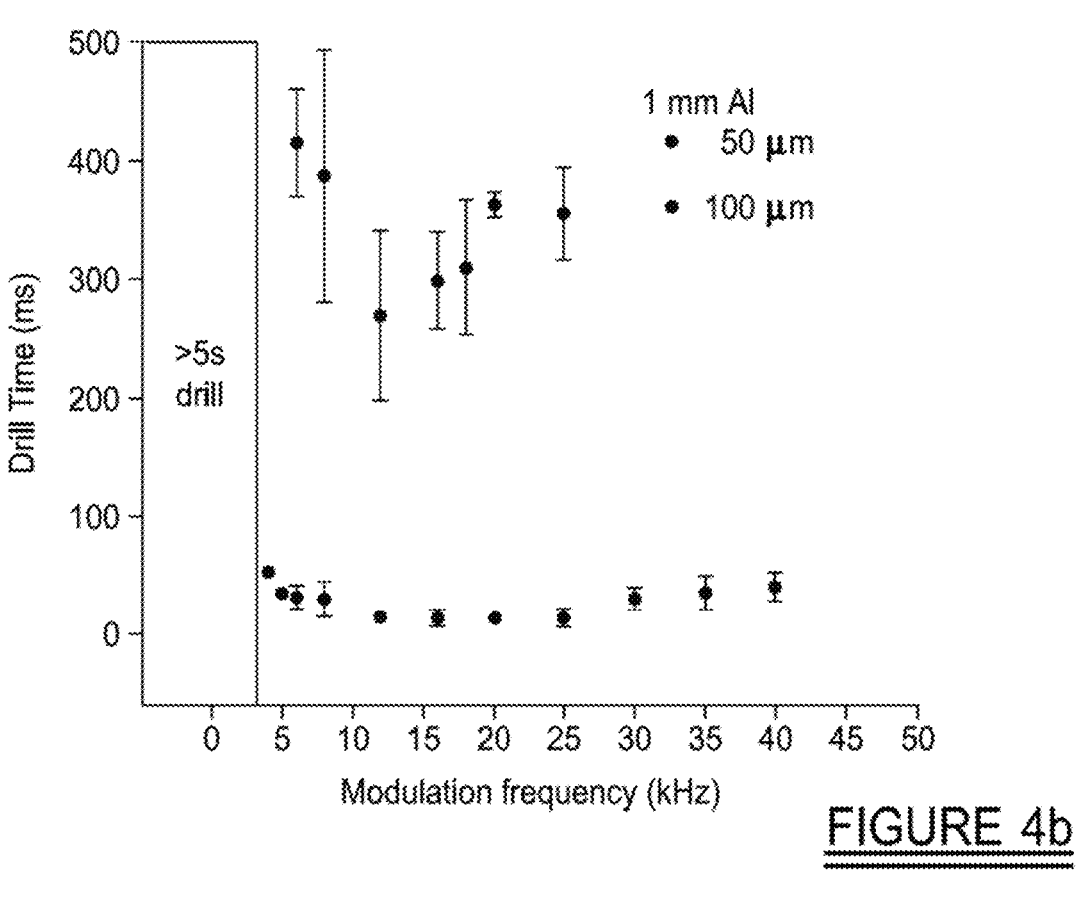
Figure 4C:
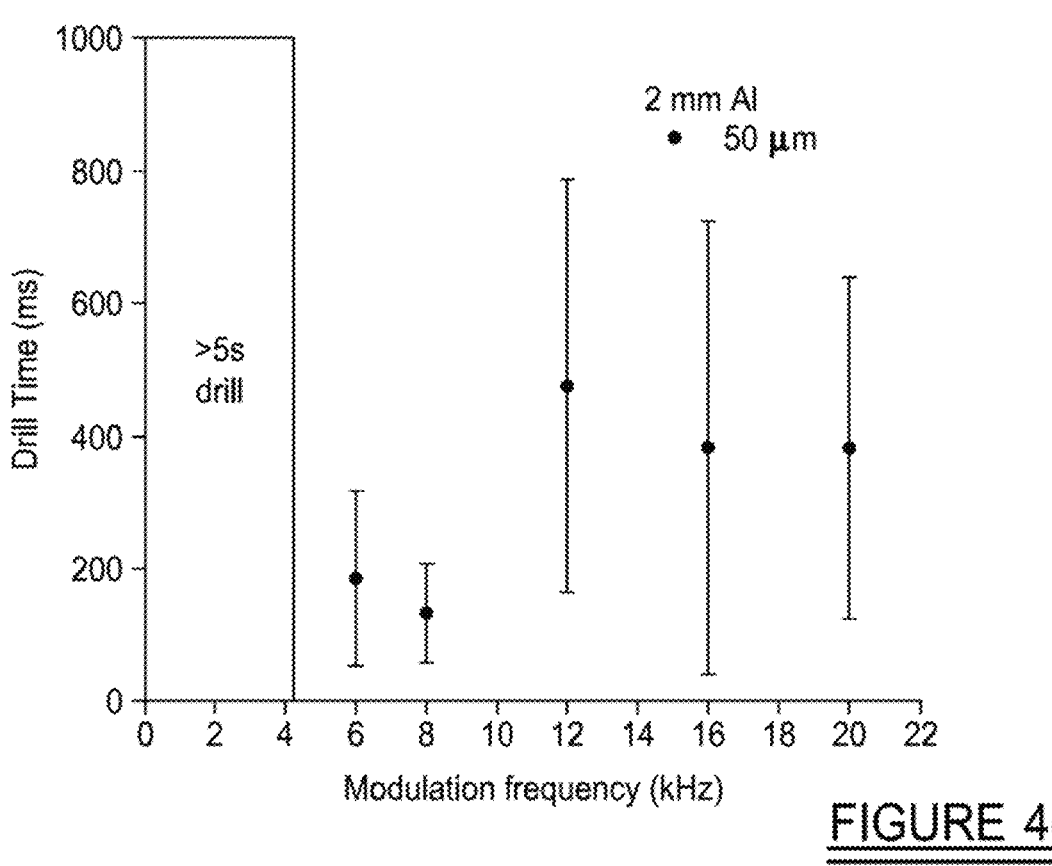
Figure 4D:
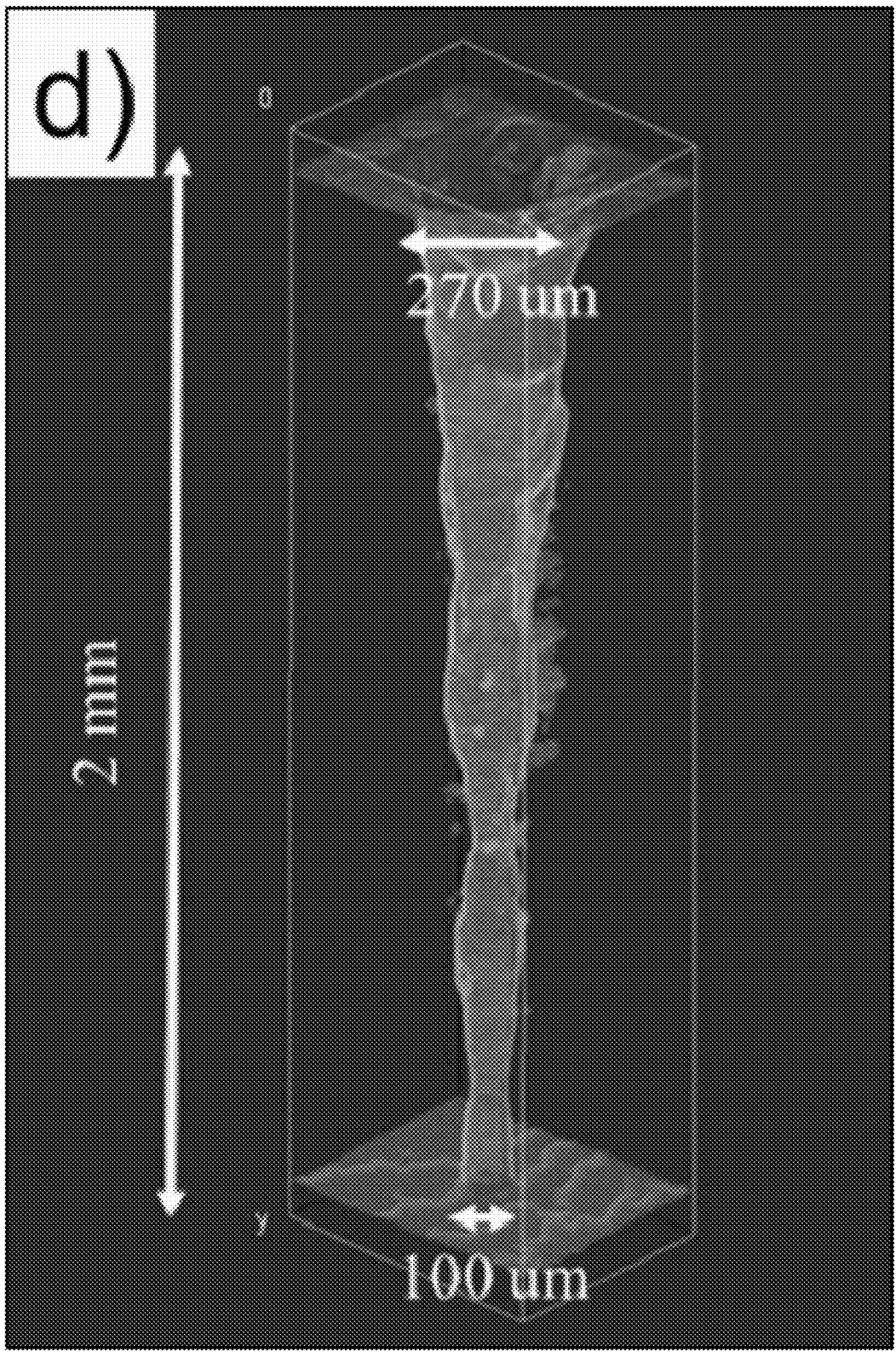
Figures 5A, 5B, 5C, 5D:
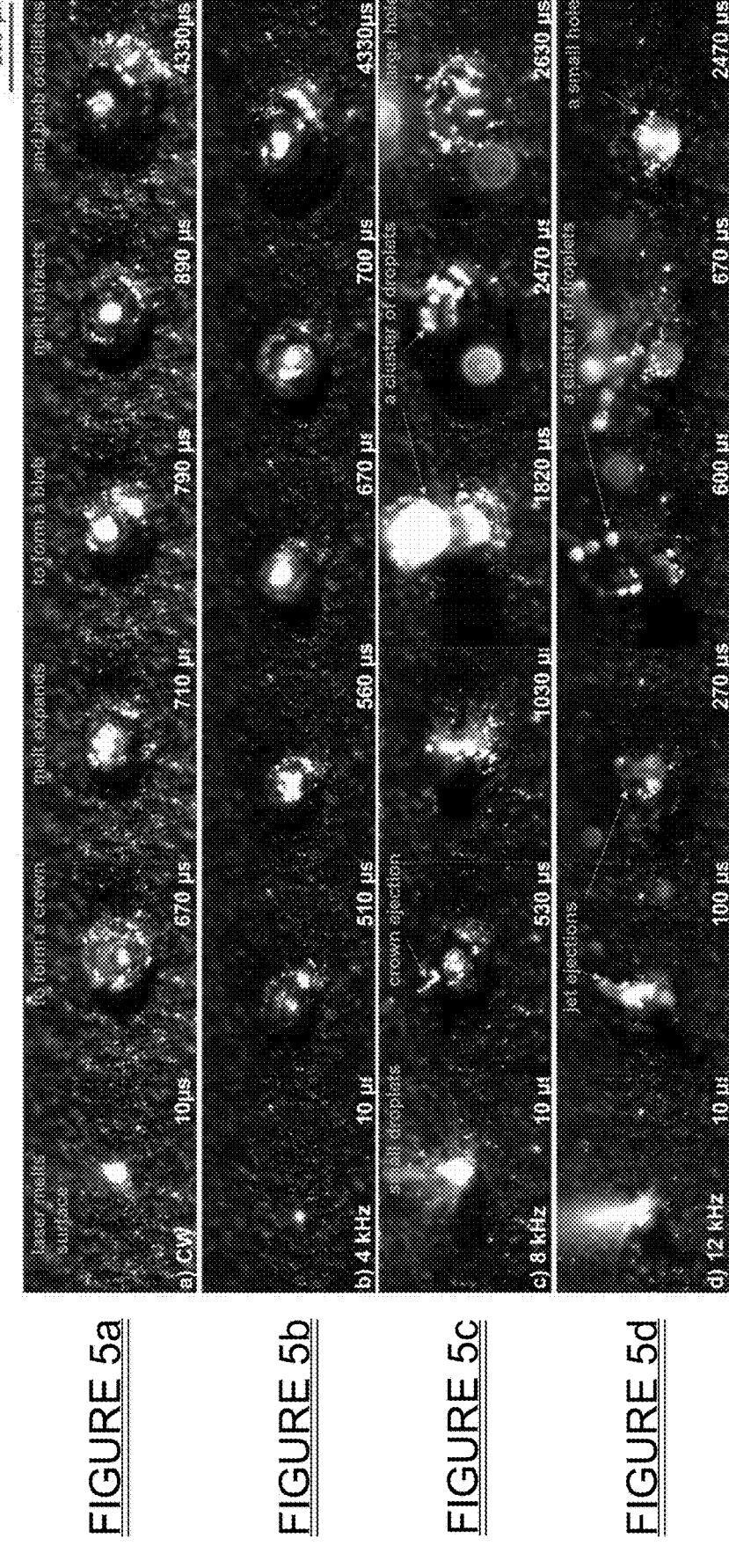

FIGS. 3a-3c show three frames of a video of melt ejection recorded at 400 kfps with CW modulation at 8 kHz, 330 W average power, at time t=0, t–200 μs and t=400 μs, demonstrating the complexity of multiple mode oscillation during the melt ejection process, and where the bright white sections indicate molten aluminum particles which have been ejected from the area where a hole (shown as a dark black circular spot at the very center of the image) is being formed;

FIG. 4a shows images obtained with a confocal microscope of holes drilled through a 2 mm aluminum plate at different modulation frequencies and laser time durations;

FIG. 4b shows drill through time through a 1 mm aluminum plate at different modulation frequencies for laser beam diameters at 50 μm and 100 μm;

FIG. 4c shows drill through time through a 2 mm aluminum plate at different modulation frequencies for laser beam diameter at 50 μm;

4d shows a computed tomography scan of the hole drill through time through a 2 mm aluminum plate at 8 kHz for laser beam diameter at 50 μm;

FIG. 5a shows the ablation of a sample (i.e., Al) surface using the traditional CW laser processing approach; and FIGS. 5b-5d are images showing images on a microscopic scale of the ablation of the sample (i.e., Al plate) surface using different modulation frequencies for the laser beam. The following text provides additional details of the construction and operation of systems and methods described herein.

DETAILED DESCRIPTION

Example embodiments will now be described more fully with reference to the accompanying drawings.

The present disclosure relates broadly to laser systems and methods in which resonance excitation of the surface waves results in effective melt ejection at lower intensities without light absorption in the vapor plume. The present disclosure is based in part on the understanding that the melt pool supports capillary surface waves which oscillate with a wide range of different frequencies related to the melt pool and keyhole geometry. The oscillations can be excited by an external driver such as mechanical and acoustic waves, electrical current, or laser irradiation and are akin to the well known ripple effect of a droplet impinging on a liquid surface. Since the melt has a low viscosity, the weakly damped capillary surface waves can be easily excited by recoil pressure and thermocapillary forces. Growth of the waves can induce large melt motion and result in melt ejection at temperatures below $T_b$.

The present disclosure proposes an efficient removal system and method based on resonant excitation of surface capillary waves using periodic modulation of a laser intensity. The present disclosure demonstrates that the optimal selection of modulation frequency can greatly enhance the melt removal volume and enables removal at lower temperatures, even in the absence of strong recoil pressure. If the modulation frequency matches the natural oscillation of the liquid melt, a resonance effect will be produced, and the oscillation amplitude will peak, thus leading to large droplet ejections; in contrast when the modulation is detuned from the natural frequency, the removal efficiency drops sharply.

The angular frequency of the capillary surface wave on a free surface is given by the expression $\omega=(\sigma k^3/\rho)^{1/2}$, where "σ" is surface tension, "k" is the wave number, and "ρ" is the metal density. For the lowest mode, k is approximately equal to 1/d, where d is the spot diameter. For aluminum (Al) with d~50 μm, the frequency $v=\omega/2\pi$~9 kHz.

One embodiment of a system 100 in accordance with the present disclosure is shown in FIG. 1. The system 10 includes a laser 102, which in this example is a CW fiber laser which may be controlled by an electronic controller 104. The laser 102 produces a collimated beam 106. The beam 106 is modulated using a suitable signal generator 108 which produces a modulation signal 108a which is used to control the frequency of the collimated beam 106 and produce a modulated laser beam 110. Optionally, the signal generator 108 and the laser 102 may be combined into one integrated subsystem. Still further, the laser 102, the signal generator 108 and the electronic controller 104 may likewise be combined into a single integrated subsystem, and all of the foregoing implementations are contemplated by the present disclosure.

The modulated laser beam 110 may be further focused using a focusing lens 112 to produce a focused, modulated laser beam 114. In this example, the intensity of the focused, modulated laser beam 114 is 100% modulated, meaning modulated power is between zero percent of peak power to one hundred percent of peak power, with frequency ranging from 2 kHz-40 kHz. The modulation frequency may be selected to match the resonant frequencies of the liquid melt pool. The focused, modulated laser beam 114 is directed at a sample 116, which in one example is an aluminum (Al) plate having a thickness of a few millimeters, and more particularly a thickness between about 1 mm-2 mm. The focused, modulated laser beam 114 in this example is directed along an axis generally perpendicular to a surface of the sample. The sample 116 rests on a stage 118. The stage 118 may be moved in the X and Y planes, if needed, by control signals applied to the stage 118 from the electronic controller 104 or by a separate controller (not shown). Alternatively, the stage 118 may be stationary and the laser 102 and focusing lens 112 may be moved in the X and Y planes; both implementations are contemplated by the present disclosure.

Figure 2A:
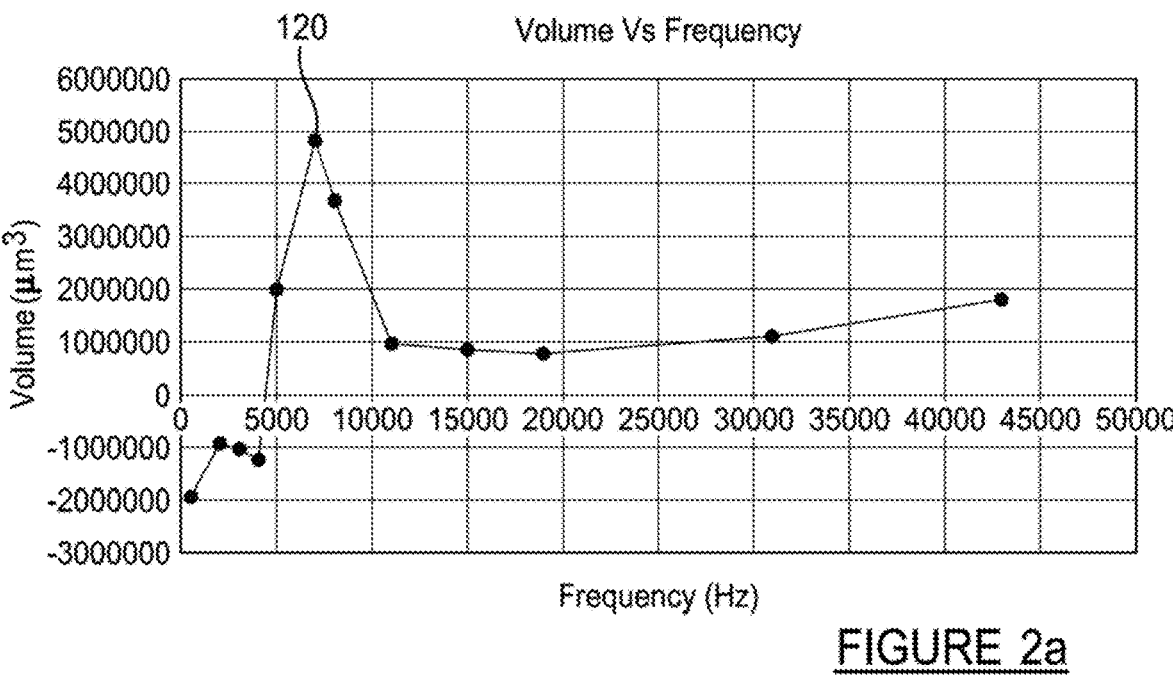
FIG. 2a is a graph illustrating one example of a removal volume of material vs. CW laser beam modulation frequency.
Figure 2B:
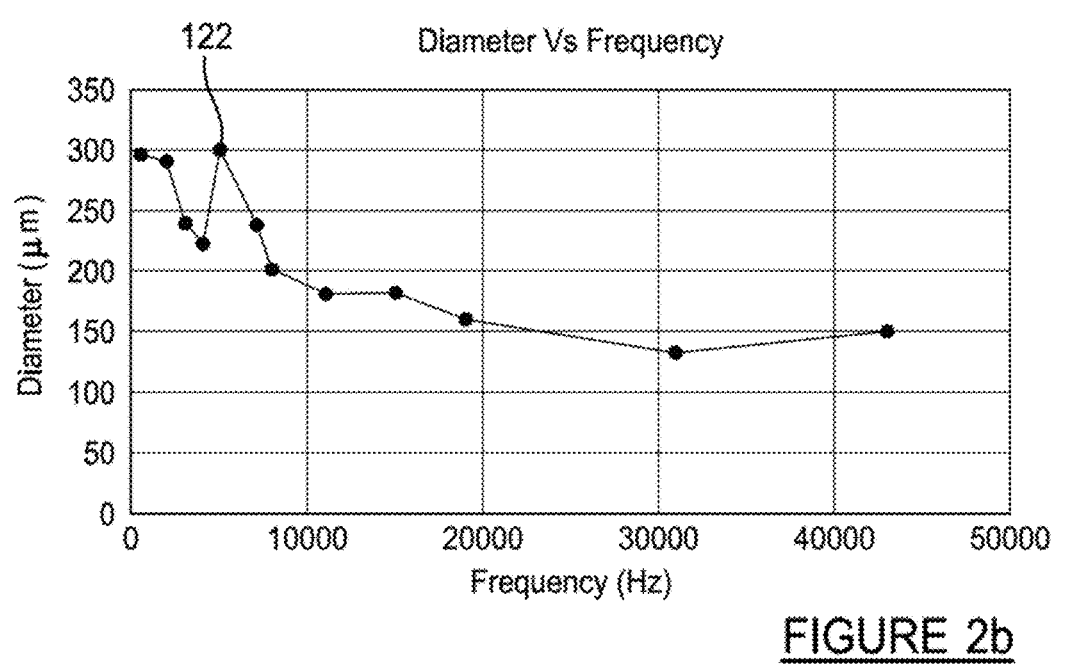
FIG. 2b is a graph illustrating how the diameter of holes (in μm) created using the modulated CW laser beam also peaked with a beam modulated at a frequency of about 8 kHz.

The removal rate for interaction with Al samples is presented on FIG. 2a. It is apparent that the removal peaked at a modulation frequency of about 8 kHz, indicated at point 120 in FIG. 2a, consistent with the above estimates. The hole diameter also peaked at about 8 kHz, as indicated at point 122 in FIG. 2b. At higher modulation frequencies the removal rate decreases, most likely due to the excitation of the higher modes. For unmodulated (or low modulation) pump, the removal rate is very low due to the direct evaporation; in other words an inefficient material removal process.

High rate video recorded at 500 kfps helps to clarify the ejection mechanism. FIGS. 3a-3c show a plurality of frames of a high rate video that demonstrates melt ejection for an optimal modulation frequency, which in this example is 8 kHz. One can see the growth of the surface perturbation up to ejection on the scale of three time periods. The images of FIGS. 3a-3c, which represent three distinct frames in the high speed video, reveal sporadic ejection of melt from the hole at times t=0, t=200 μs and t=400 μs. The ejected molten Aluminum particles are indicated by 124 in FIGS. 3b and 3c. FIGS. 3b and 3c also reveal a dark black hole 126 in the middle of each image, from which the molten aluminum particles 124 are being ejected.

The focused, modulated beam 114 was used to drill high aspect ratio holes as part of further testing. Referring to FIG. 4a, illustrations of a plurality of holes "drilled" into a 2 mm thick aluminum plate using the system 100 at 600 W maximum power and 300 W average power, and with different modulation frequencies and for different time durations are shown. Holes 200 and 202 shows the entrance hole formed for the unmodulated CW at 600 W and 300 W. For hole 200, the entrance hole is large ~700 um surrounded by a large heat affected zone with multiple cracks. The collateral damage (i.e., cracking, material redeposition, large heat zone) produced by CW excitation is well known. For hole 202, the entrance hole is much smaller since the power and temperature is half of hole 200. For the modulated beam, the entrance holes are smaller, and the heat affected zone is practically absent. Hole 204 was produced using a modulation frequency of 2 kHz; hole 206 using a modulation frequency 4 kHz; hole 208 using a modulation frequency of 8 kHz and a drilling time of less than 2 seconds; hole 210 using a modulation frequency of 12 kHz; hole 212 using a modulation frequency of 16 KHz and a drilling time of less than 2 seconds; hole 214 using a modulation frequency of 20 KHz and a drilling time of less than 2 seconds, hole 216 using a modulation frequency of 8 KHz and a drilling time of less than 2 seconds; hole 218 using a modulation frequency of 12 kHz; hole 220 using a modulation frequency of 16 kHz and a drilling time of less than 2 seconds; and hole 222 using a modulation frequency of 20 kHz.

For a 1 mm sample using a d=50 μm 1/e² modulated beam with peak power at 600 W, the drill-through time is around 20 ms, reproducible from test to test, with maximum removal around 12 kHz (FIG. 4b). When the beam size is doubled to d=100 μm 1/e² at the same power P, the drill-through time increased above 200 ms. At frequencies below 4 kHz, there were no drill through after 5 s. For the 2 mm sample, the 50 μm modulated beam always drilled through in less than 1 s, but drill-through times varied stochastically with a trend to optimum removal at 8 kHz (FIG. 4c). There is a large dispersion in drill-through times. First, as the laser drills deeper into the channel, many effects come into play. The laser radiation is reflected, diffracted and absorbed by the walls. Second, the melted layer has to travel along the walls back up the hole entrance but surface tension can stop it. The combination of these effects contribute to the dispersion in drill-through times.

FIG. 5 compares ablation of a surface using different modulation frequencies. The images shown are frames from video recorded at 100 kfps for unmodulated CW, 4 kHz, 8 kHz, and 12 kHz. The average power is 300 W for the CW case, and the peak power is 600 W for the modulated case. The total drill time is 5 ms. For the case of unmodulated CW (FIG. 5a) and 4 kHz (FIG. 5b), laser recoil pressure pushes down on the melt, and the thermocapillary force drives the flow to the side to form a crown. During melting, the material density decreases, and now the same amount of material occupies a larger volume. The volume expands upward but surface tension pulls the melt inward to form a blob. The liquid blob stops expanding laterally since the melt does not wet the substrate, and subsequently retracts. As a result, the blob is stable—the nonresonant excitation of the capillary waves induced only oscillations with little melt ejection. The cycle repeats itself every 100-150 μs with a blob that moves up and down (axi-symmetric mode).

For modulation frequencies at 8 kHz (FIG. 5c) and 12 kHz (FIG. 5d), near the resonance, large melt removal is observed throughout the entire drilling time. Small, high velocity droplets eject within 5 μs of the laser initiation. As the crown expands, droplets also break apart from the perimeter of the crown. The depression formed is now large enough that during melt retraction, a central jet emerges from the center of the pit (at 100 μs and 270 μs in FIG. 5d) and escapes in the vertical direction. Unlike the CW case where liquid is constantly ejected, in the near resonance case, periodic burst of materials occurs every few cycles due to the time it takes for the resonance to build up. At 2470 μs in FIG. 5c and 670 μs in FIG. 5d, a large cluster of particles explode violently outward to leave a hole. As the laser penetrates deeper into the channel, a large jet of liquid bursts out (see video at 3700 and 5300 at 8 kHz). From the video, both axi-symmetric (up and down) and asymmetric (sloshing mode) oscillations are observed.

The foregoing description of the system 100 and its operation demonstrates that modulation of a CW laser in an optimal frequency range significantly increases the removal rate of material by the laser beam. The optimal frequency range is consistent with the excitation of capillary waves. The resonant frequencies can be broad because absorption, scattering, and reflection of light can affect the resonant frequency and lead to multiple oscillating modes.

The proposed methods for efficient melt removal described herein may be used for applications beyond simply hole drilling. One additional example is in metal sheet cutting, where material can be removed without extensive evaporation, which can increase a processing rate and efficiency.

The present disclosure thus teaches a laser based systems and methods which use modulation of the laser intensity to increase melt removal efficiency and to thus enhance a drilling and/or cutting process. The modulation frequency may be selected to match the frequency of a melt capillary ground mode. The typical frequency is in the kHz range, more typically between about 1 kHz and 20 kHz, and even more typically about 8 kHz. The resonance excitation of the surface wave results in effective melt ejection. As a result, the melt removal rate is enhanced dramatically. Practical applications of the disclosed systems and methods include enhanced drilling with a high aspect ratio and an increase in a cutting rate for laser metal processing.

The present disclosure thus discloses a laser system and method which uses modulation of the laser intensity produced by a CW laser to increase melt removal efficiency and to thus enhance a drilling and/or cutting process. The modulation frequency may be selected to match the frequency of a melt capillary ground mode. The typical frequency is in the kHz range, and more typically between about 1 kHz and 20 kHz, and even more typically about 8 kHz. The resonance excitation of the surface wave results in effective melt ejection. As a result, the melt removal rate is enhanced dramatically. Practical applications of the disclosed systems and methods include enhanced drilling with a high aspect ratio and an increase in a cutting rate for laser metal processing.

The laser systems and methods described herein also operate at a lower temperature than that typically used with conventional laser drilling and cutting, with much less energy absorbed in ejection of material. The systems and methods of the present disclosure may be applied for high aspect ratio hole drilling and/or to increase the cutting efficiency when cutting a material.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method for providing efficient liquid melt removal of material from a spot on a surface of a material sample, the method comprising:

using a continuous wave (CW) laser to generate a collimated laser beam;

focusing the collimated laser beam to a desired spot size on the surface of the material sample; and modulating the collimated laser beam from the CW laser at a predetermined frequency, which matches a natural resonant oscillation frequency of the liquid melt, and wherein an output power of the laser beam is also modulated within a predetermined power range, both of which combined are sufficient to excite and amplify surface capillary waves on the surface of the sample up to a melt ejection point, to fully eject the liquid melt from the spot on the surface of the sample.

2. The method of claim 1, wherein generating a collimated laser beam comprises using a laser beam having a peak power of 600 watts and an average power of 330 watts.

3. The method of claim 1, wherein focusing the collimated laser beam to a desired spot size comprises using a focusing lens.

4. The method of claim 1, wherein modulating the collimated laser beam at a predetermined frequency comprises determining the predetermined frequency of the capillary waves using an expression: $\omega = (\sigma k^3 / \rho)^{1/2}$, where "$\sigma$" is surface tension, "$k$" is a wave number, and "$\rho$" is a metal density of the sample.

5. A method for providing efficient melt removal of material from a spot on a surface of a material sample, the method comprising:

using a continuous wave (CW) laser to generate a collimated laser beam;

focusing the collimated laser beam to a desired spot size on the surface of the material sample; and modulating the collimated laser beam from the CW laser at a predetermined frequency, and having a peak power of 600 watts and an average power of 330 watts, which is sufficient to excite and amplify surface capillary waves on the surface of the sample up to a melt ejection point, to eject material from the spot on the surface of the sample.

* * * * *